March 24, 1936. F. H. HOPKINS ET AL 2,035,129
SAFETY VALVE
Filed Nov. 14, 1933 2 Sheets-Sheet 1

INVENTORS
Frank H. Hopkins
Ernest B. Crocker
BY
Darby & Darby
ATTORNEYS.

March 24, 1936. F. H. HOPKINS ET AL 2,035,129
SAFETY VALVE
Filed Nov. 14, 1933 2 Sheets-Sheet 2
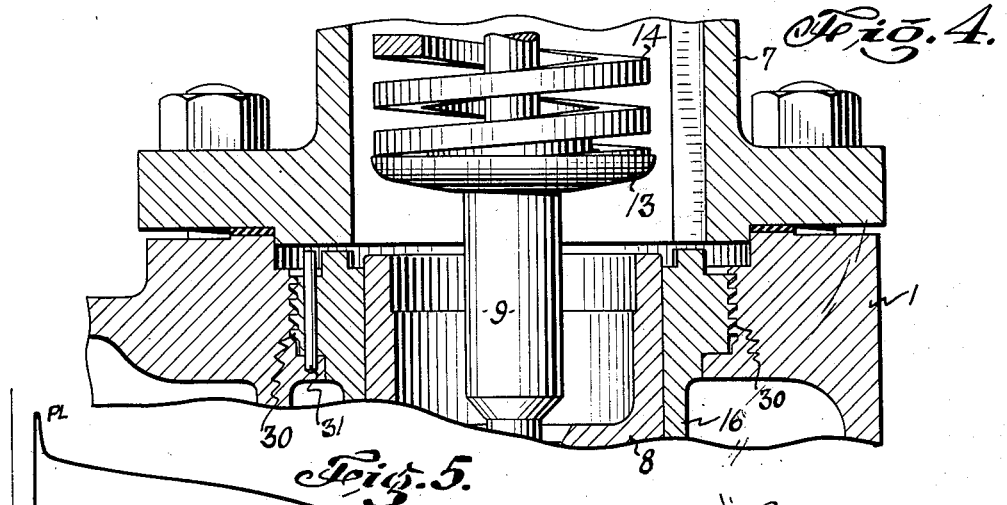
Fig. 4.
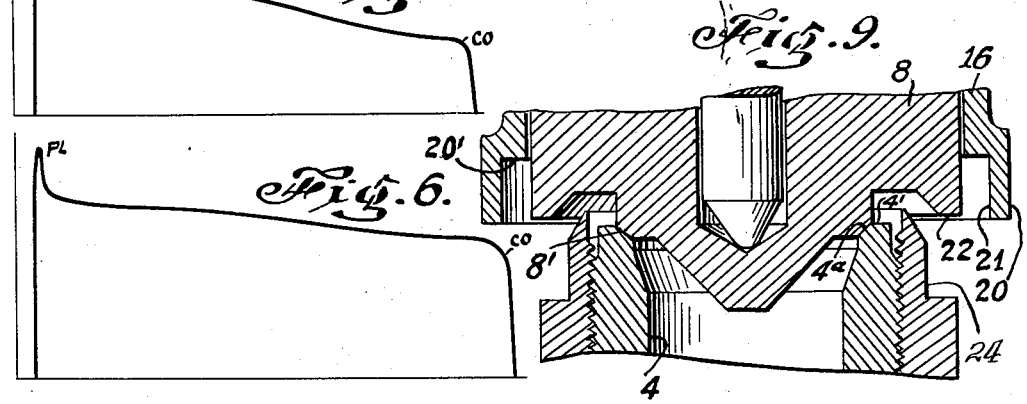
Fig. 5.
Fig. 9.
Fig. 6.
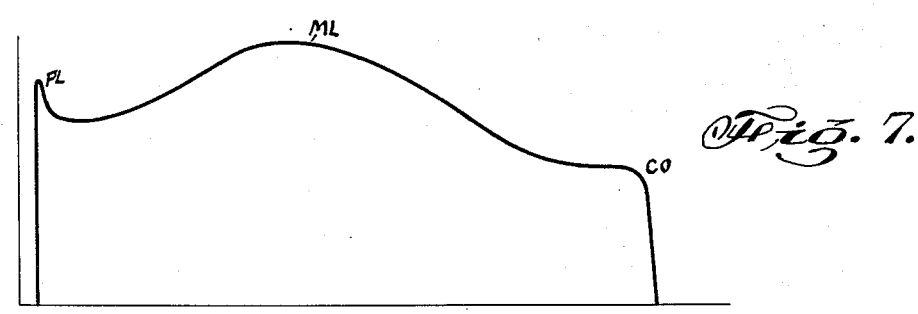
Fig. 7.
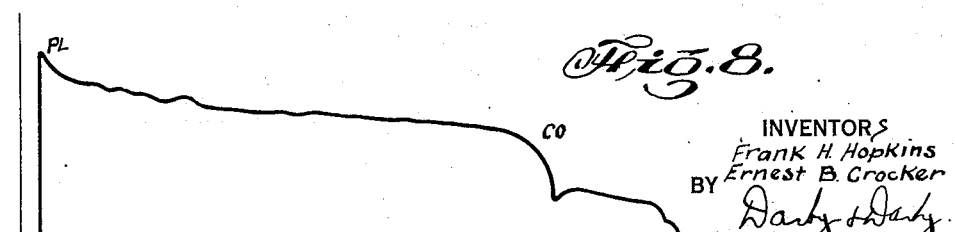
Fig. 8.
INVENTORS
Frank H. Hopkins
Ernest B. Crocker
BY
Darby & Darby
ATTORNEYS.

Patented Mar. 24, 1936

2,035,129

UNITED STATES PATENT OFFICE 2,035,129

SAFETY VALVE

Frank H. Hopkins, Fairfield, and Ernest B. Crocker, Stratford, Conn., assignors to Consolidated Ashcroft Hancock Company, Inc., Bridgeport, Conn., a corporation of Delaware Application November 14, 1933, Serial No. 697,890

10 Claims. (Cl. 137—53)

This invention relates to safety valves.

The general basic object of this invention is to provide an improved form of construction and a new principle of control of pop action, for spring loaded safety valves having maximum discharge capacity for a given valve size.

An important object of this invention is to provide a safety valve for use on steam boilers, or in connection with oil stills and the like in which the fluid discharge is preferably downward to prevent coking which, as is well known, causes the valve to stick.

Another important object of this invention involves the structure by means of which the valve disc is guided by means of a floating guide to insure correct seating.

A further object of this invention is to provide a skirt on the guide sleeve which forms a pressure retaining chamber to enhance the lifting effect of the escaping fluid.

A still further object of this invention is to provide a safety valve construction in which for maximum capacity valves it is possible to use a conical seat.

A still further object of this invention involves the construction of the roof of the valve disc which overhangs the valve seat to cause a change in direction of the flow of escaping fluid to aid in correct operation of the valve.

A still further object of this invention involves a structure in which, for maximum capacity valves where the disc is guided above the seat, a load spindle is applied to the disc at a point below the seat when the disc is seated.

A still further object of this invention is to provide a baffle wall in the valve chamber in relationship to the discharge to prevent dragging of the disc into spot contact as it seats, thereby eliminating galling, leaking and erosion.

A more general object of this invention is to provide a safety valve having a maximum operating lift with more positive action during blow-down and closing within the usual limits of 2% to 6% of the set pressure.

These and many other objects as will appear from the following disclosure are secured by means of this invention.

This invention resides substantially in the combination, construction, arrangement and relative location of parts, all as will appear more fully hereinafter.

In the drawings,

Fig. 4 is an enlarged, central, transverse cross sectional view through a portion of the valve, illustrating a modified structure for attaching the floating guide to the valve body;

Fig. 5 is a lift card showing the action of the valve of this invention with the pressure retaining chamber formed by the skirt on a guide omitted;

Fig. 6 is a lift card with the complete valve of this invention showing the increased jump lift and the closing lift with the pressure chamber employed;

Fig. 7 is a lift card for the valve of this invention illustrating the pop lift and the lift when the valve is forced to a 3% over pressure upon which lift the valve capacity is rated; and Fig. 8 is a lift card for valves with faulty control action.

Figure 9 is a diagrammatic representation of the relative positioning of the parts at the seat.

Figure 1:
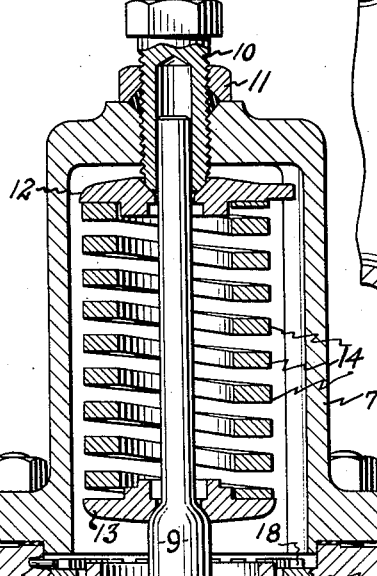
Figure 1 is a central vertical cross sectional view showing a general assembly of the valve of this invention.

It is highly important in the production of an efficient and practical safety valve to have positive uniform operation. A desirable safety valve should open nearly full lift at pop and gain the maximum lift ML when the pressure has been forced to 3% above the set pressure (see Fig. 7). Inversely the valve disc should maintain a substantial proportional lift until the reduction in pressure reaches the proper blow-down value where seating should be positive. The means for controlling blow-down adjustment should positively control the valve action within the limits of 2% to 6% of the set pressure.

The valve of this invention meets these requirements, and in addition has a number of desirable constructional and operational features which will be described in full detail.

The present invention is more particularly, but not necessarily, directed to a spring loaded safety valve having maximum discharge capacity for a given size and an adjustable range of blow-down control as low as 2% of the set pressure embodied in a construction which is relatively simple.

Heretofore safety valves having maximum discharge capacity and low blow-down control, have been known, but to accomplish such operation they have employed complicated structural features making them expensive to manufacture and difficult to adjust.

The more important object of this invention is to provide an overhead guided valve disc, a floating guide, means on the guide to form a pressure retaining chamber to give more positive lift, a conical seat in a maximum capacity valve, a baffle for balancing the discharge pressure in the valve body to prevent spot contact of the disc with the seat, thereby eliminating galling, leaking and erosion, a constructional relationship between the top of the deflector ring which is adjustable in relative position to the roof of the valve disc and a construction in which the point of application of the loaded spindle to the disc is below the valve seat. These objects are attained in a maximum capacity discharge valve with a positiveness of action not heretofore attained. In addition the valve of this invention operates positively and uniformly on opening lift, retaining a high proportion of that lift throughout discharge until closing, which takes place sharply.

As illustrated in the drawings, the valve comprises a body or casing 1 forming a chamber 2 and having a supporting flange 3 at the base. At 4 is the nozzle which is provided at its inner end with a conical seat lying preferably at an angle of 45 degrees with the axis of the bushing. It is of course apparent that this seat could be formed directly on the valve body. The valve body has a flange extension 5 which provides the discharge connection for the chamber.

Figure 3:
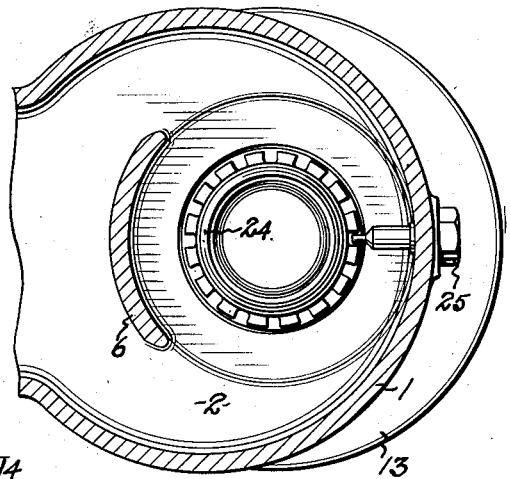
Fig. 3 is a cross sectional view taken on the line 3—3 of Figure 1.
Figure 2:
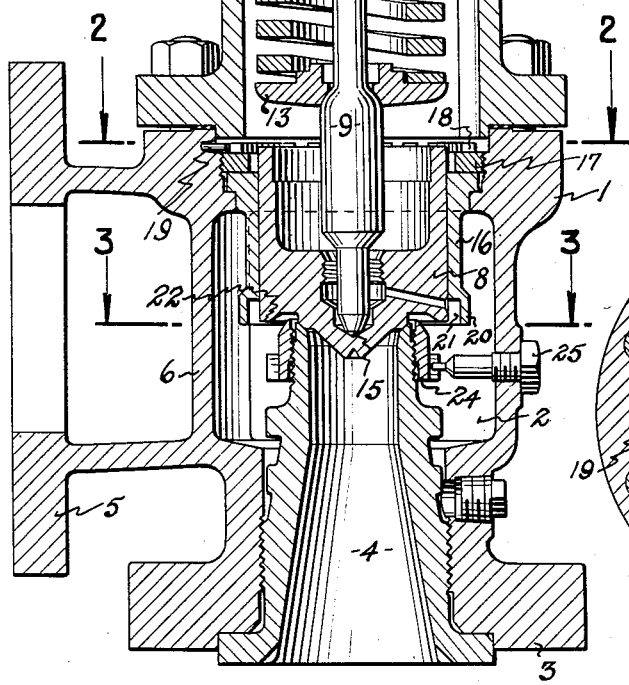
Fig. 2 is a cross sectional view taken on the line 2—2 of Figure 1.
Figure 2:
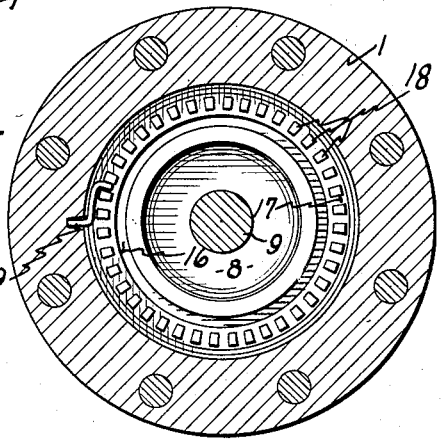

At 6 is a baffle wall of arcuate form extending for a distance of approximately one-quarter the circumferential extent of the body chamber. As is clear from Fig. 3, the valve body is properly shaped so as not to interfere with full capacity discharge therefrom.

The purpose of the baffle is to balance the pressure in the body chamber as a compensation for the tendency to develop unbalanced pressures therein due to the fact that the fluid is all discharged from one side of the chamber. An unbalanced pressure in the chamber resulting from this cause, tends to produce spot contact between the disc and seat causing galling, leaking and erosion. The presence of the baffle eliminates these tendencies.

The valve top 7 is secured to the valve body in any suitable manner as by means of nuts and studs as shown.

Interposed between the circumferential ledge within the valve body and an adjustable ring 17, threadedly engaging the valve body, is the valve disc and guiding sleeve 16. The guiding sleeve 16 is proportioned at its point of contact with the valve body so as to be permitted slight radial movement. The adjustable ring 17 is adjusted for correct operation of the valve so that the sleeve is permitted slight longitudinal movement. By this construction the sleeve is likewise allowed slight cocking movement so that it is, in effect, a floating sleeve. The ring is provided with a plurality of lugs 18 on its upper surface and when adjusted, may be held in locked position by means of a Z-shaped pin 18 which engages a recess in the valve body.

The valve disc 8 is slidably supported in the guide sleeve.

By means of this construction it is possible to employ a conical seat in a top guided disc safety valve. A conical seat is by far the preferable form of seat because it remains tight, but it has been very difficult to employ heretofore, especially in top guided valves. By means of the guide sleeve 16 of this invention, it is now possible and practical to employ a conical seat. A conical seat naturally cooperates with the seating surface on the disc to guide the disc to accurate seating position. The guiding action is permitted with this structure, because of the floating support for the guide sleeve 16. The valve disc may move between small limits in a radial direction and can likewise move through small angles with respect to the longitudinal axis of the valve. Thus, the disc is accurately and smoothly guided to its seat.

The spindle 9 engages the valve disc at the point 15 which is somewhat below the plane of the seating surface of the disc. In an overhead guided disc, this is an important feature. It is possible to guide the disc by means of a spider below the seat. However, in high capacity valves, the use of a spider reduces the proper flow of fluid. With the construction of this invention, the load may be applied to the disc at the desired point, namely, at or below the seating surface of the disc.

Mounted between the discs 12 and 13 and supported on a spindle 9 is the loading spring 14 which engages an adjustable bolt 10 through the upper disc 12. By means of this structure, the load on the disc may be properly adjusted. A lock nut 11 insures locking of the parts in adjusted position.

The lower end of the guide sleeve 16 is provided with a skirt 20 of larger internal diameter than the sleeve to form a pressure retaining chamber 21. The end wall of the chamber 21 should be slightly above the disc rim 22 at maximum lift, and the plane of the end surface of the skirt 20 lies slightly above the plane of the end surface of the seat formed on the upper end of the nozzle. As the valve disc rises to progressively expose the chamber 21, the escaping fluid builds up a pressure therein, which causes the valve disc to remain nearer the point of maximum lift than is the case where this chamber is omitted. The result of the presence of the pressure chamber is illustrated in Fig. 6 as compared to Fig. 5. Fig. 5 is a lift card for the valve of this invention with the pressure chamber omitted. Fig. 6 shows the improved action when the pressure chamber is employed. The valve disc remains proportionately higher with respect to full or maximum lift PL in the case of Fig. 6 and maintains this position better than in the case of Fig. 5 until cut off CO. Likewise at cut-off more positive action occurs by reason of the presence of the pressure chamber. As the valve disc descends, the fluid is diverted so that the additional pressure created by the pressure retaining chamber is reduced to give sharper cut-off.

The roof of the valve disc extends radially beyond the seat, and the disc as shown is provided with an annular groove having its outer wall inclined outwardly as shown, thus forming the disc roof into two flat surfaces on different planes. The fluid passing through the seat opening when the valve pops and when the pressure is at, or above, the set pressure, exerts lifting force on all projected surfaces of the disc, but as the pressure under the disc is reduced and the spring force causes the disc to drop gradually, the inclined surfaces which form the outer wall of the groove deflect the steam or fluid away from the flat end of the disc on its outer edge and also out of the pressure chamber and by the influence of the deflector adjusting ring a positive blowdown control is produced. It is a combination of all of these forces which makes for higher maximum lift and it is the relationship of these parts which insures smoother action. It is to be noted that the outer rim 22 of the roof of the disc is likewise in a plane slightly above the end plane of the seat on the bushing 4 when the valve is closed. The external surface of the bushing adjacent the seat is threaded to support an adjustable deflector ring 24 which may be held in adjusted position by means of the member 25. This adjusting ring is located so as to intercept a portion of the discharge of the fluid so as to properly direct it against the roof of the disc. It is by adjusting this ring that the valve is controlled to bring blow-down as low as 2% of the set popping pressure.

Figure 9 of the drawings illustrates an enlarged view of the valve at the seat showing the relative position of the parts when the disc 8 is seated. In seated position, at which time the seating surfaces 4a and 8' are in contact, the plane of the end of the rim 22 is a short distance above the plane 4' of the end of the bushing. The plane of the end of the skirt 20 is likewise a very slight distance above the plane 4' of the end of the bushing. When the disc is at maximum lift the plane of the end of the rim 22 is just below the plane 20' of the top of the chamber 21 formed by the skirt.

The improved positive action of the valves of this invention is graphically illustrated by comparison of the lift cards of Figs. 5, 6, and 7 with the lift card of Fig. 8 which is representative of prior art constructions.

The modified arrangement of Fig. 4 illustrates a different structure for floatingly supporting the guide sleeve 16. In this case the guide sleeve engages the valve body by means of buttress threads 30, and the parts are locked in adjusted position by means of a pin 31 which passes through the guide sleeve into a recess in the guide body. This construction likewise allows slight radial, longitudinal and angular movement of the sleeve so as to properly guide the disc.

From the above description it will be apparent that the valve of this invention involves certain principles of operation which may be embodied in other physical forms by those skilled in the art without departure from the scope of this invention. We do not, therefore, desire to be strictly limited to the disclosure as given for purposes of illustration, but rather to the scope of the appended claims.

What we seek to secure by United States Letters Patent is:

1. In a pop safety valve, the combination comprising a casing having a seat therein, a valve disc having a cooperating seating surface, a guiding sleeve surrounding said disc within which the disc moves in sliding engagement as it seats and unseats and having a skirt forming a chamber around the lower end of the disc the upper wall of the chamber being above the plane of the roof of the valve disc at maximum lift.

2. In a pop safety valve, the combination comprising a casing having a seat therein, a valve disc having a cooperating seating surface, a floating guide sleeve surrounding said disc and secured to said casing and within which the valve disc slides, said sleeve having a skirt forming a chamber around the lower end of the disc, the plane of the end surface of the skirt lying slightly above the plane of the end surface of the seat.

3. A safety valve as described comprising a casing having a valve seat therein, a reciprocable valve disc within said casing having a cooperating seat, a guide sleeve surrounding said disc, means for loosely supporting the sleeve on said casing so as to permit slight movement thereof caused by movement of the disc, and a skirt on the lower end of said sleeve, forming a chamber between its inner face and the outer wall of the valve disc in all positions of the disc.

4. A safety valve as described comprising a casing having a valve seat therein, a reciprocable valve disc within said casing cooperating with said seat, a guide sleeve surrounding said disc, means for loosely supporting the sleeve in said casing so as to permit slight lateral movement thereof caused by the movement of the disc, and a skirt on the lower end of said sleeve to form a chamber between the inner face of the sleeve and the outer wall of the valve disc in all positions of the disc, the plane of the end face of the skirt being slightly above the plane of the top of the seat.

5. A safety valve as described comprising a body member forming a chamber, means having an inlet opening to said chamber terminating in a seat, a valve disc having a seating surface formed thereon, a guide sleeve surrounding said disc and loosely supported in said body member so that the sleeve may be moved slightly by the movement of the valve disc, said valve disc extending radially beyond its seat and having a groove in the extending portion, means for adjustably loading said disc and a skirt formed on the lower end of said sleeve forming a chamber with the lower end of the disc.

6. A safety valve as described comprising a body member forming a chamber, means having an inlet opening to said chamber terminating in a seat, a valve disc having a seating surface formed thereon, a guide sleeve surrounding said disc and loosely supported in said body member so that the sleeve may move slightly in accordance with the disc movement, said valve disc extending radially beyond its seat and having a groove in the extending portion, means for adjustably loading said disc, a skirt formed on the lower end of said sleeve forming a chamber with the lower end of the disc and an adjustable deflector ring surrounding the seat on said member.

7. A safety valve as described comprising a body member forming a chamber, means having an inlet opening to said chamber terminating in a seat, a valve disc having a seating surface formed thereon, a floating guide sleeve surrounding said disc and supported in said body member so that the sleeve may move slightly, said valve disc extending radially beyond its seat and having a groove in the extending portion, means for adjustably loading said disc, a skirt formed on the lower end of said sleeve forming a chamber with the lower end of the disc and an adjustable deflector ring surrounding the seat on said member, the plane of the end surface of the skirt lying slightly above the plane of the end surface of the seat and the plane of the extending portion of the roof of the disc lying slightly above the plane of the end surface of the seat when the valve is closed.

8. In a pop safety valve, the combination comprising a casing having a seat therein, a valve disc having a cooperating seating surface and a floating guide sleeve having a skirt member surrounding said disc, the skirt being radially spaced from the disc, the valve disc sliding within the sleeve in contact therewith, the plane of the end surface of the skirt member lying slightly above the plane of the end surface of the casing seat.

9. A pop safety valve as described comprising a casing having a chamber therein, means forming a conical seat in said chamber, a disc having a conical seat, a floating sleeve mounted on said casing within said chamber and directly surrounding said disc, said sleeve being capable of slight radial and longitudinal movement under the moving action of the disc, and a baffle wall positioned in said chamber around which fluid must pass after discharge by the seat.

10. A fluid valve as described comprising a body member forming a chamber having a discharge opening, means forming an inlet opening to the chamber having a conical seat thereon, a valve disc having a conical seat, a guide sleeve surrounding said valve disc and loosely secured to said casing whereby the sleeve may undergo slight radial and longitudinal movement under the action of the movement of said valve disc, and a baffle wall mounted in said body member within said chamber between the inlet and discharge openings to balance the fluid pressure in said chamber during discharge through the discharge opening.

FRANK H. HOPKINS.
ERNEST B. CROCKER.